(12) United States Patent
Huang

(10) Patent No.: US 7,269,905 B1
(45) Date of Patent: Sep. 18, 2007

(54) STRUCTURE OF A MINIATURE HACKSAW

(76) Inventor: Yin-Hae Huang, P.O. Box 697, Fongyuan City, Taichung County (TW) 420

(*) Notice: Subject to any disclaimer, the term of this patent is extended or adjusted under 35 U.S.C. 154(b) by 212 days.

(21) Appl. No.: 11/174,517

(22) Filed: Jul. 6, 2005

(51) Int. Cl.
*B27B 21/00* (2006.01)

(52) U.S. Cl. .................................. 30/507; 30/517

(58) Field of Classification Search .............. 30/506, 30/507, 514, 517, 523, 329; D8/97
See application file for complete search history.

(56) References Cited

U.S. PATENT DOCUMENTS

| | | | | |
|---|---|---|---|---|
| 3,756,298 A | * | 9/1973 | West | 30/507 |
| 4,651,425 A | * | 3/1987 | Livian | 30/507 |
| 4,827,619 A | * | 5/1989 | Alm | 30/507 |
| D359,436 S | * | 6/1995 | Weimann | D8/97 |
| 6,711,825 B2 | * | 3/2004 | Chen | 30/507 |
| 6,789,326 B1 | * | 9/2004 | Huang | 30/517 |

FOREIGN PATENT DOCUMENTS

EP 0286 613 * 10/1988

* cited by examiner

*Primary Examiner*—Hwei-Siu C. Payer

(57) ABSTRACT

A structure of a miniature hacksaw includes a handle, a bow frame connected with the fore end of the handle. The bow frame has a longitudinal slit and the handle has a limited space including an opening in outer side, a plurality of ribs on inner side, a first and second pivot holes respectively in an upper and a lower wall and a through hole in the front of the limited space. A radial fixture is engageable into the limited space and having an axial hole engaged with the pivot holes and rotatably secured by a rivet. It is characterized in that turns in the radial fixture into the limited space, its protruded stopping surface in cooperation with the ribs will clamp the saw blade very tight without loosening.

1 Claim, 7 Drawing Sheets

STRUCTURE OF A MINIATURE HACKSAW

BACKGROUND OF THE INVENTION

The present invention relates to carpentry tool and more particularly to a structure of a miniature hacksaw which has a blade quick fixing device.

Prior art hacksaw 1 (as shown in FIG. 1) comprises a handle 2, a slit 3 through the center of the handle 2 along the length thereof, a bow frame 4 connected the fore end of the handle. The bow frame 4 has a screw hole 6 in fore end engaged with screw 7 which has a hexagon head 8 to clamp the fore end of a saw blade 5. The rear end of the saw blade 5 inserts into the slit 3 of the handle 2.

The above clamping method is popularly used to the miniature hacksaws. But no matter it fastens or unfastens, it needs another tool. Further, in operation the hexagon head 8 always touches the working piece causing a great inconvenience.

SUMMARY OF THE PRESENT INVENTION

The present invention has a main object to provide a structure of a miniature hacksaw. When assembles or disassembles the sawblade, it is very convenient without using any fastening tool.

Another object of the present invention is to provide a structure of a miniature hacksaw in which the saw blade is tightly fixed without loosening and the fixture is hidden in the handle clamped by the hand of the operator and presents a uniform outlook.

Accordingly, the structure of a miniature hacksaw comprises generally a handle, a bow frame connected with the fore end of the handle. The bow frame has a clamping slit to clamp the fore end of a saw blade which has a rear end inserted into a transverse limited space in the handle and fixed by a radial fixture. When turns the fixture into the limited space, the saw blade is automatically clamped and when turns the fixture outward, the saw blade is setting free to disassemble.

The present invention will become more fully understood by reference to the following detailed description thereof when read in conjunction with the attached drawings.

DETAILED DESCRIPTION OF THE PREFERRED EMBODIMENT

Figure 1:
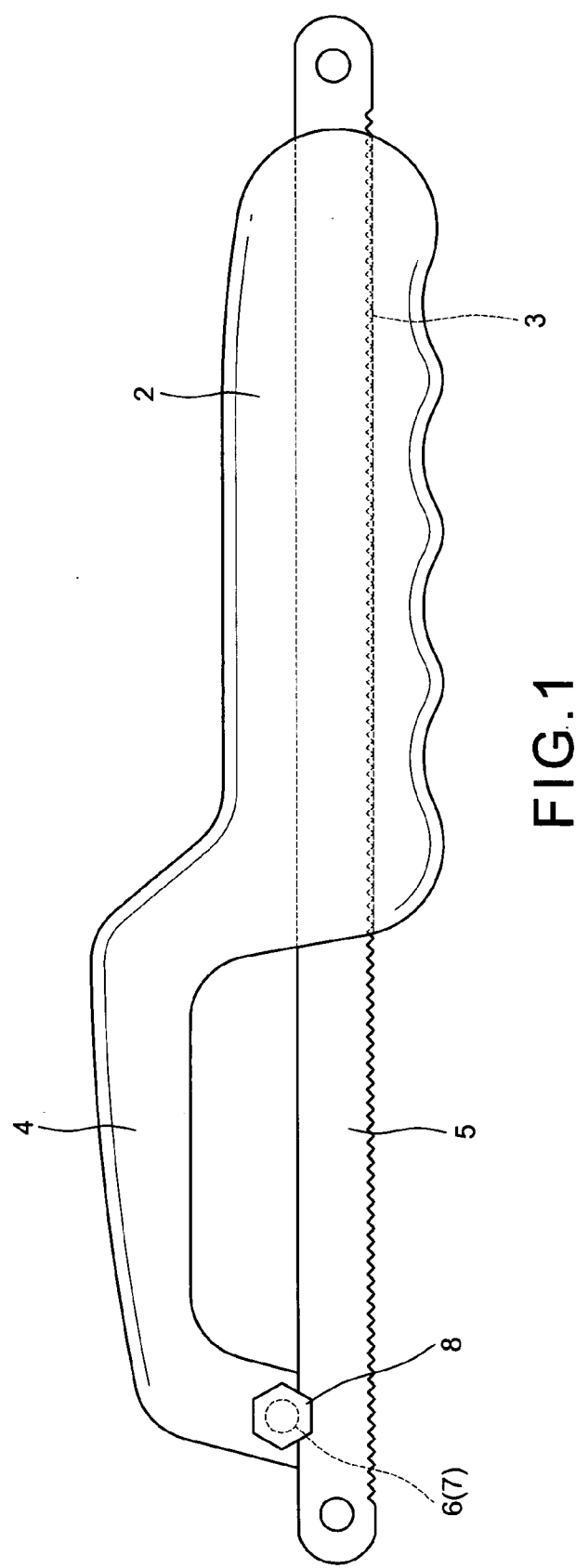
FIG. 1 is a plane view of the miniature hacksaw according to a prior art.
Figure 2:
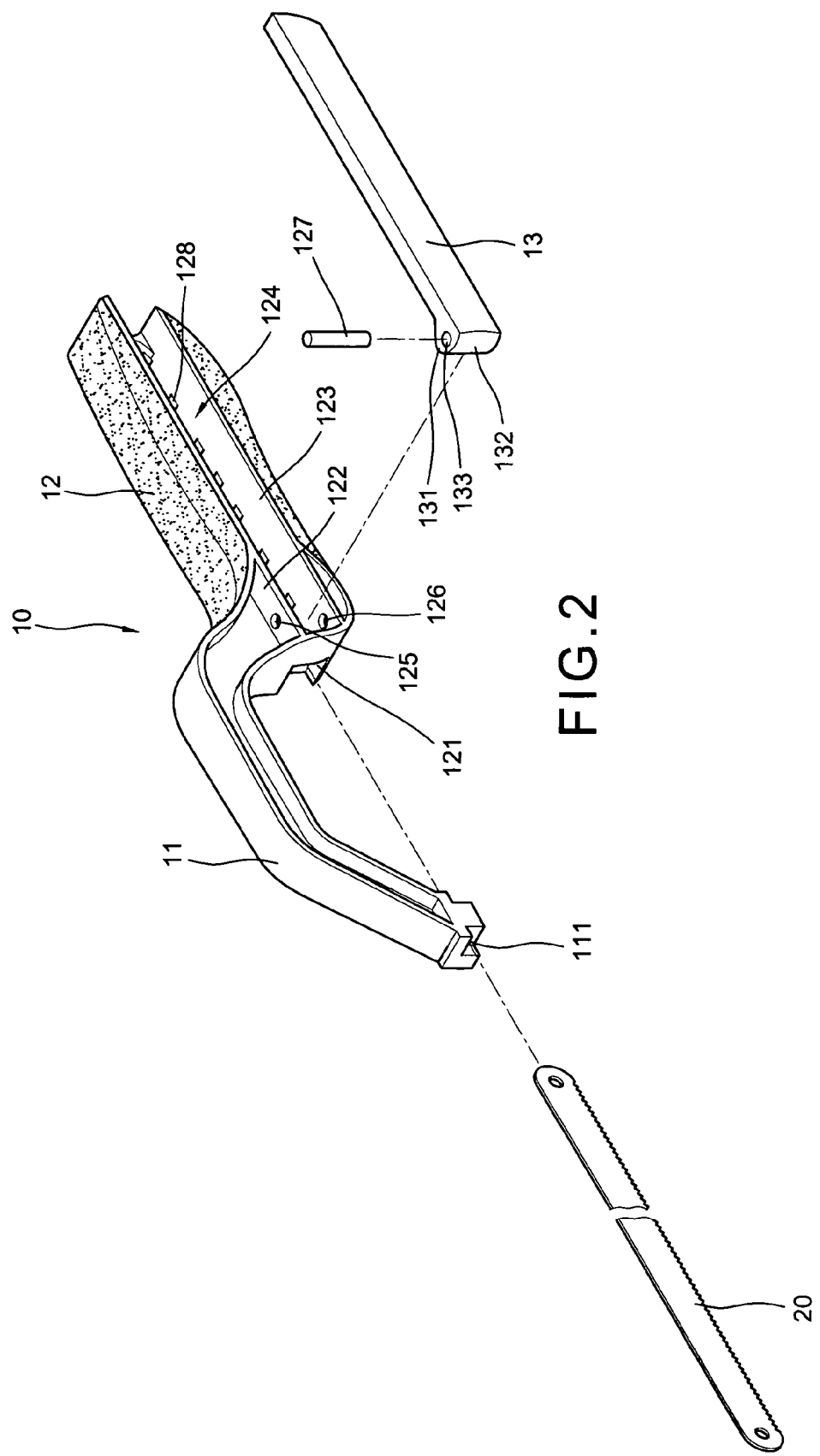
FIG. 2 is an exploded perspective to show the preferred embodiment of a miniature hacksaw according to the present invention.
Figure 3:
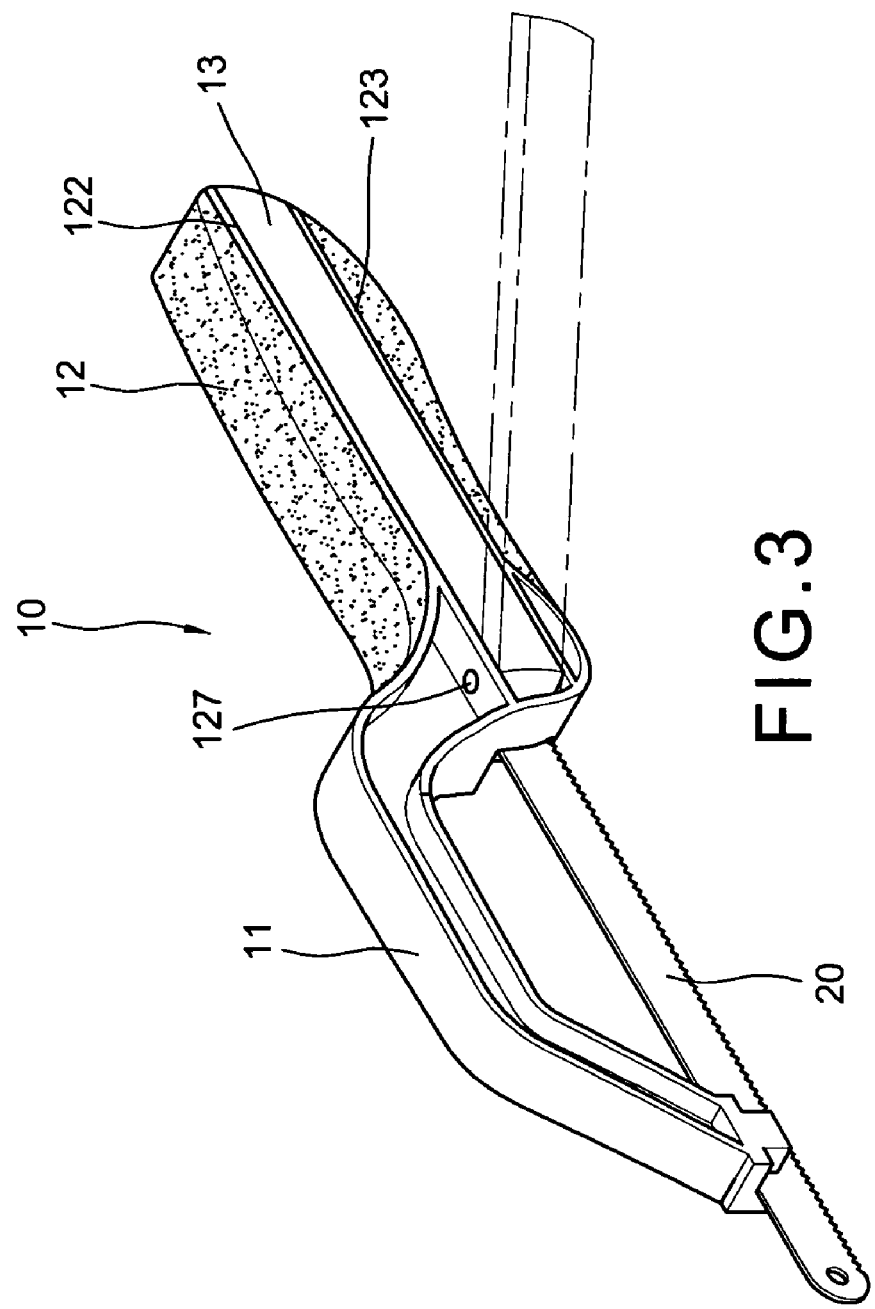
FIG. 3 is an assembly view to show a radial fixture in operation.
Figure 4:
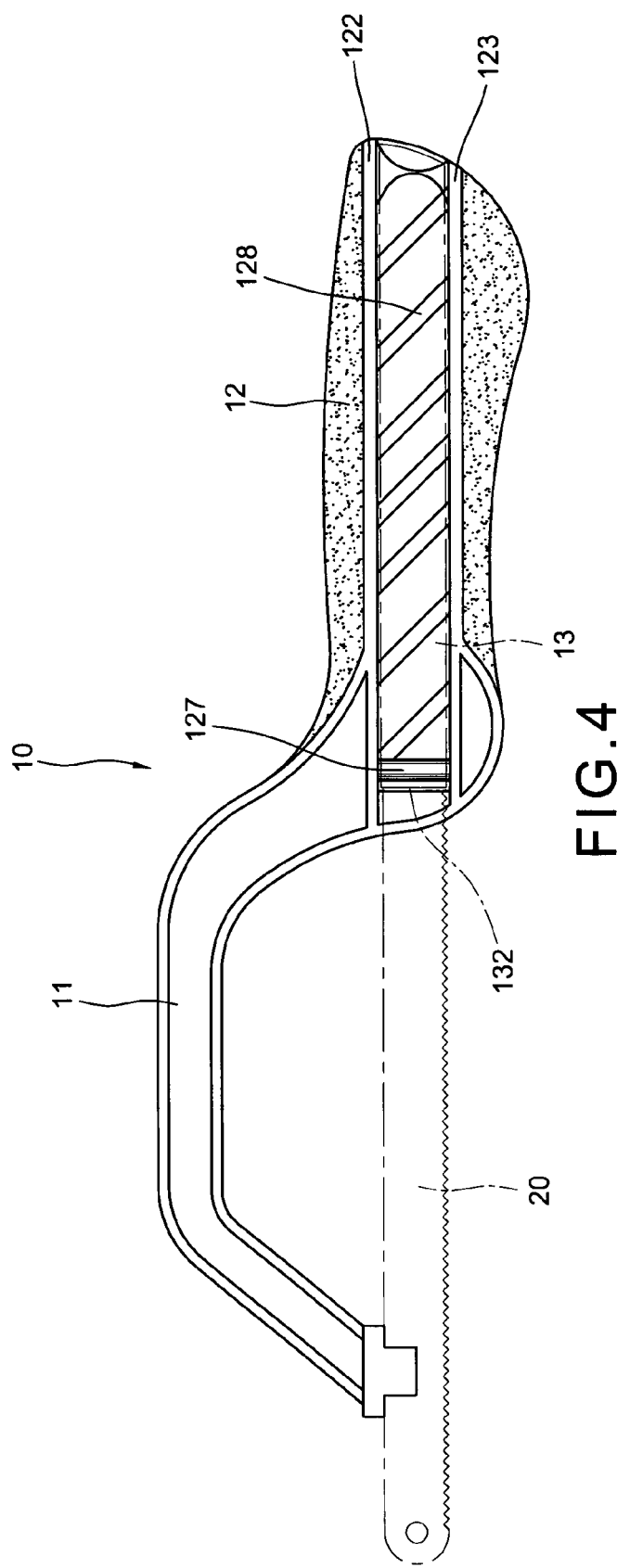
FIG. 4 is a longitudinal section to show that the saw blade is fixed.
Figure 5:
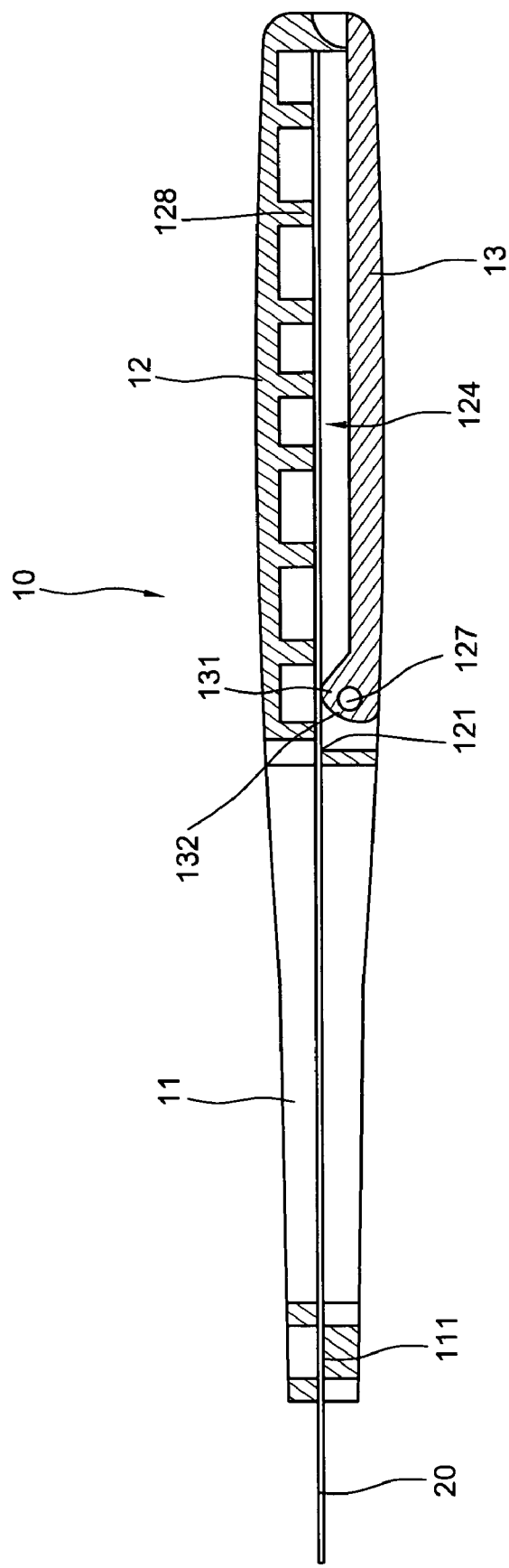
FIG. 5 is a top section of FIG. 4.

With reference to the drawings and initiated from FIGS. 2, 3 and 4, the structure of a miniature hacksaw 10 comprises a bow frame 11 at fore portion connected to the fore end of a straight handle 12. The fore end of the bow frame 11 has a longitudinal slit 111 having the width similar to the thickness of a saw blade 20 so as to be able to clamp the saw blade 20 (as shown in FIG. 5). The handle 12 has a through hole 121 in fore end communicated to an opened longitudinal limited space 124 in the handle 12. The limited space has an upper wall 122, a lower wall 123. The two walls 122 and 123 each has a pivot hole 125 and 126 made in registry to each other and a plurality of the ribs 128 spacedly formed on the inner side. A radial fixture 13 is engageable into limited space 124 and has an axial hole 133 in fore end engaged with the pivot holes 125 and 126 and rotatably secured by a rivet 127. The fore end of the radial fixture 13 has a protruded stopping surface 131 for clamping the saw blade 20 and a deviation surface 132 for releasing the saw blade 20.

Figure 7:
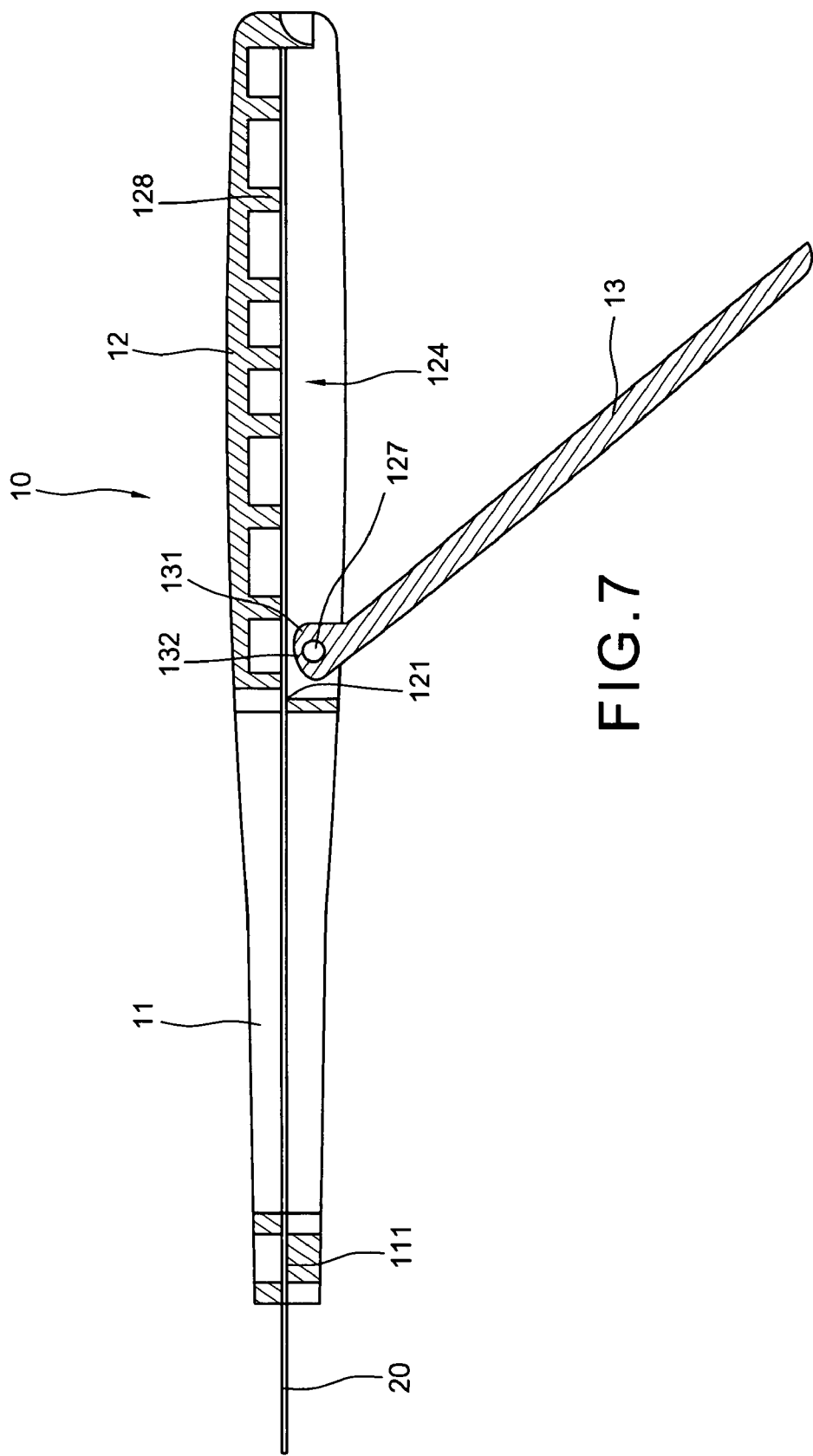
FIG. 7 is a longitudinal section indicating that the radial fixture is turned out of the handle.

Upon the above discussed structure, the miniature hacksaw 10 of the present invention is operated as shown FIG. 7, first turn the radial fixture 13 outward from the limited space 124 to have its deviation surface 132 toward the ribs 128. Then mount on the saw blade 20 by clamping its fore end into the slit 111 and its rear end inserted into the limited space via a through hole 121 in the fore end of the limited space 124 and then leaning on the ribs 128.

Figure 6:
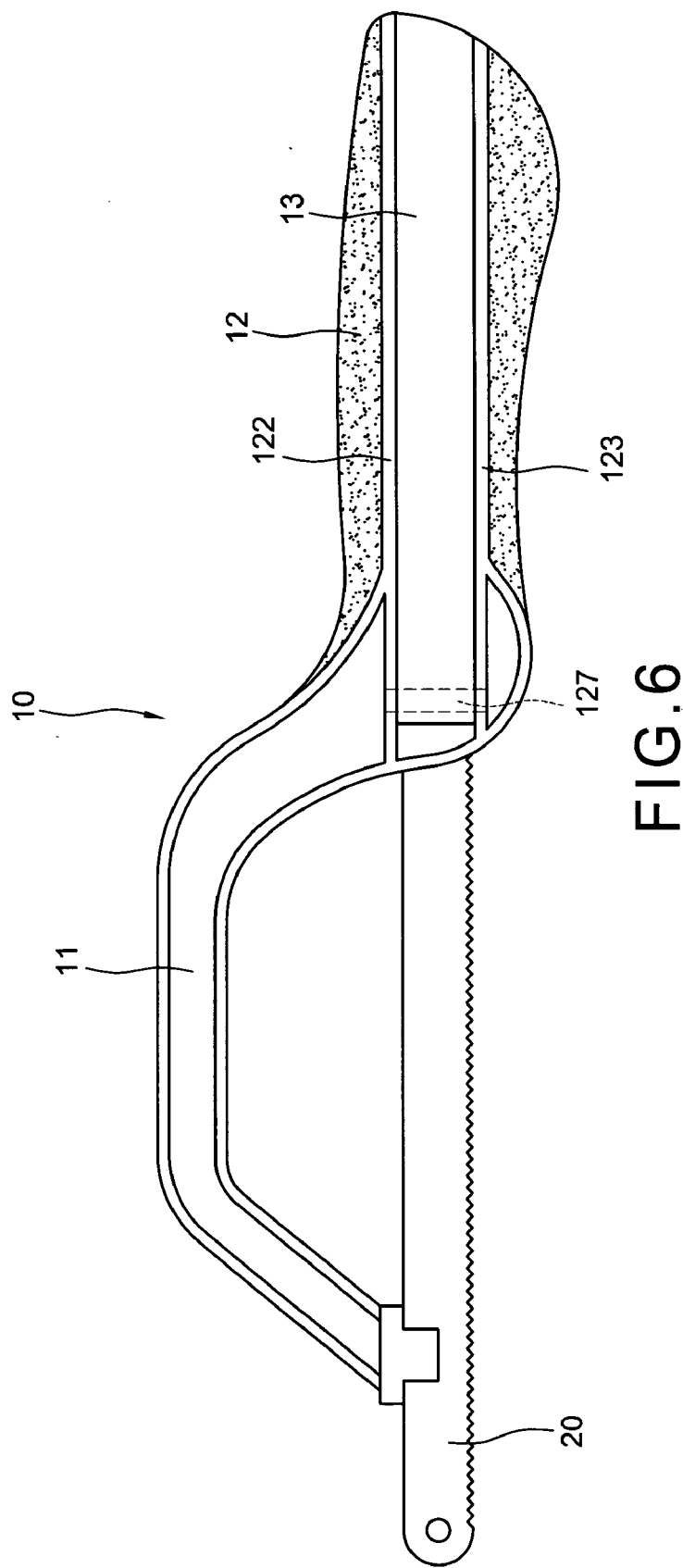
FIG. 6 is a plane view to show that the saw blade is already fixed.

Referring to FIG. 6 and FIGS. 3, 4 and 5 again, turn the radial fixture 13 inward into the limited space 124 to have its protruded stopping surface 131 stopped against the saw blade 12 which is now clamped by the ribs 128 and the protruded stopping surface without loosening.

Further, the radial fixture hides in the handle 12 that there is no any opening device exposed out so as to keep an uniform outlook. During operation, the hand of an operator tightly clamps the handle that prevents the radial fixture 13 from turning outward or loosening, such that the small radial fixture 13 has three great advantages:

a) turn it inward to naturally fix the saw blade 20 and turn outward to set the saw blade free;

b) the radial fixture 13 is of hidden type, no need of other devices to fix the saw blade 20, there is no any protrudent element, it not only provides a smooth clamping of the handle 12, but also provides an uniform beauty;

c) during cutting, both the handle 12 and the radial fixture 13 are clamped by hand without considering an outward turn.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. A structure of a miniature hacksaw comprising:

a straight handle connected on fore end thereof with a bow frame which has a longitudinal slit in fore end thereof;

said handle having a longitudinal limited space including an opening on an outer side thereof, a through hole in a fore end thereof, an upper wall, a lower wall, a plurality of ribs spacedly formed on an inner side thereof, a first pivot hole and a second pivot hole in said upper and lower walls adjacent their fore end;

a radial fixture engageable into said limited space and having an axial hole engaged with the pivot holes and rotatably secured by a rivet, a protruded stopping surface and a deviation surface around said axial hole;

a saw blade having a fore end clamped by said longitudinal slit and a rear end inserted into the limited space via the through hole;

whereby, turns the radial fixture into the limited space such that the protruded stopping surface in cooperation with the ribs clamp the saw blade tightly.

* * * * *